(12) United States Patent
Smith et al.

(10) Patent No.: US 7,241,096 B2
(45) Date of Patent: Jul. 10, 2007

(54) CAPTIVE SCREW WITH DEPLOYABLE KNOB

(75) Inventors: Kelly K. Smith, Spring, TX (US); Ismael Rodriguez, West Chester, PA (US); Loic J. Cloarec, West Chester, PA (US); Daniel T. Thompson, Houston, TX (US)

(73) Assignees: Hewlett-Packard Development Company, L.P., Houston, TX (US); Southco, Inc., Concordville, PA (US)

( * ) Notice: Subject to any disclaimer, the term of this patent is extended or adjusted under 35 U.S.C. 154(b) by 196 days.

(21) Appl. No.: 11/160,472

(22) Filed: Jun. 24, 2005

(65) Prior Publication Data

US 2006/0291977 A1    Dec. 28, 2006

(51) Int. Cl.
*F16B 21/18* (2006.01)
*G08F 1/20* (2006.01)

(52) U.S. Cl. .................. 411/353; 411/352; 411/999; 411/107; 411/396; 361/726

(58) Field of Classification Search ............... 411/353, 411/352, 999, 107, 396; 361/726
See application file for complete search history.

(56) References Cited

U.S. PATENT DOCUMENTS

| | | | | |
|---|---|---|---|---|
| 1,513,710 A | * | 10/1924 | Lewis | ............... 24/676 |
| 2,919,736 A | * | 1/1960 | Myron | ............... 411/353 |
| 2,948,317 A | * | 8/1960 | Munro | ............... 411/352 |
| 2,967,557 A | * | 1/1961 | Tait et al. | ............... 411/349 |
| 3,126,935 A | * | 3/1964 | Tuozzo | ............... 411/352 |
| 3,314,696 A | * | 4/1967 | Ferguson et al. | ...... 285/148.14 |
| 3,346,032 A | * | 10/1967 | Bulent | ............... 411/349 |
| 4,464,090 A | * | 8/1984 | Duran | ............... 411/103 |
| 4,732,343 A | * | 3/1988 | Maruyama | ............... 242/282 |
| 5,000,614 A | * | 3/1991 | Walker et al. | ............... 403/326 |
| 5,382,124 A | * | 1/1995 | Frattarola | ............... 411/352 |
| 5,520,490 A | * | 5/1996 | Perach et al. | ............... 411/353 |
| 5,704,100 A | * | 1/1998 | Swan | ............... 24/656 |
| 6,669,423 B2 | | 12/2003 | Smith | ............... 411/396 |
| 6,682,282 B2 | * | 1/2004 | Allen | ............... 411/353 |
| 6,856,514 B2 | | 2/2005 | Smith | ............... 361/726 |
| 6,955,512 B2 | * | 10/2005 | Allen et al. | ............... 411/353 |
| 7,146,831 B2 | * | 12/2006 | Antonucci et al. | ............ 70/208 |
| 2006/0291977 A1 | * | 12/2006 | Smith et al. | ............... 411/353 |

* cited by examiner

*Primary Examiner*—Katherine Mitchell
(74) *Attorney, Agent, or Firm*—Paul & Paul

(57) ABSTRACT

A captive screw for use in electronic assemblies includes a screw with a shaft having a pair of spaced grooves and a cover captivating the screw and for attaching the captive screw. A knob for rotating the screw can be moved along the shaft between an extended position and a lowered position corresponding to the grooves on the shaft, and releasably locked to the shaft in either position. A lock wafer is used to secure the knob to the shaft. A release button with a large head actuates the lock wafer.

14 Claims, 6 Drawing Sheets

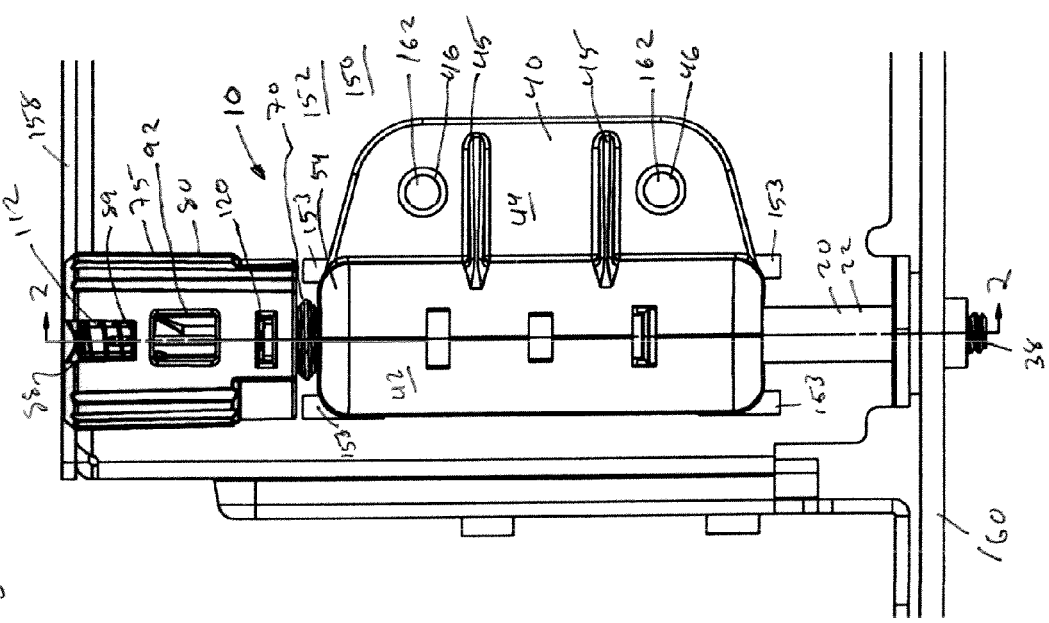

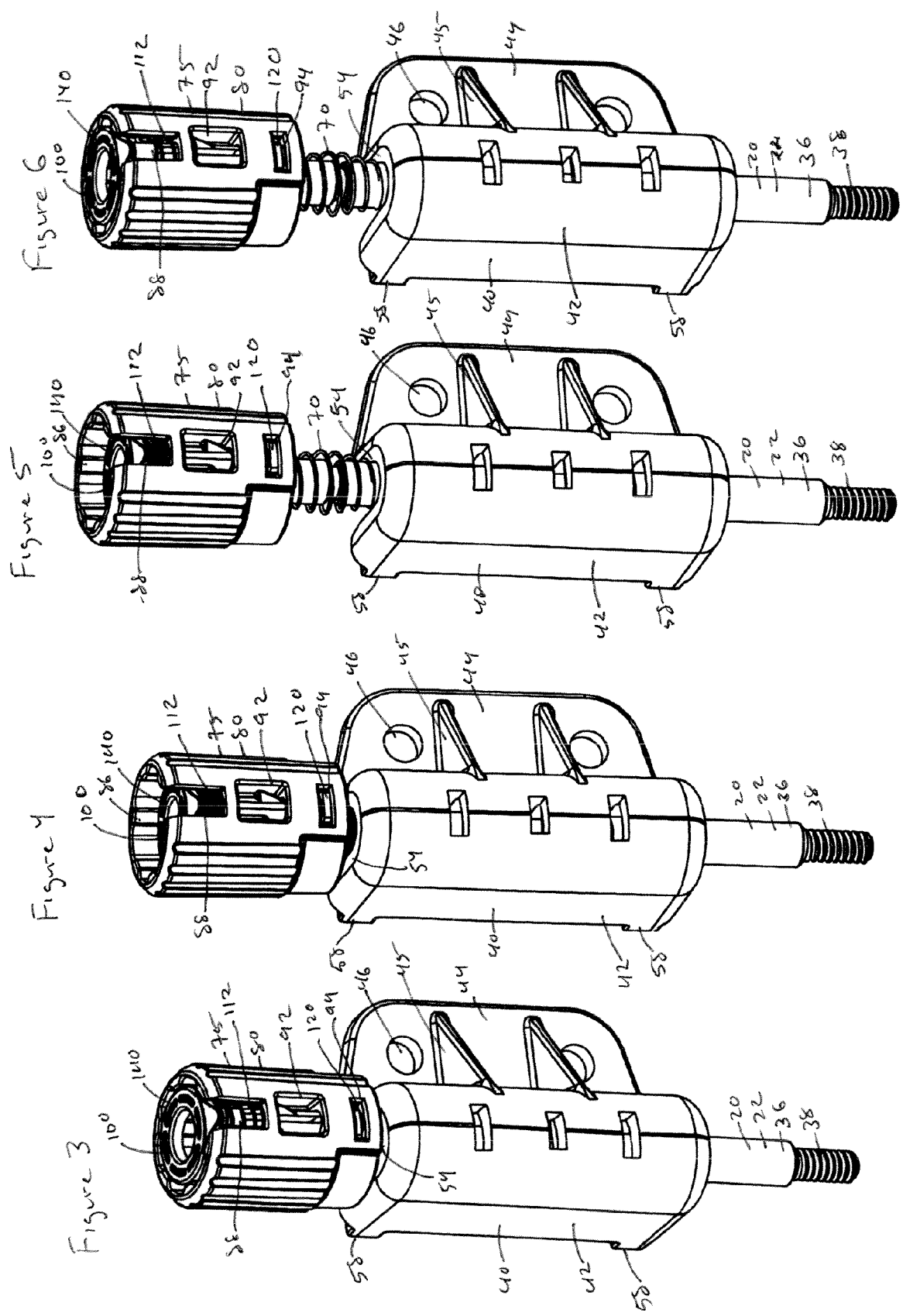

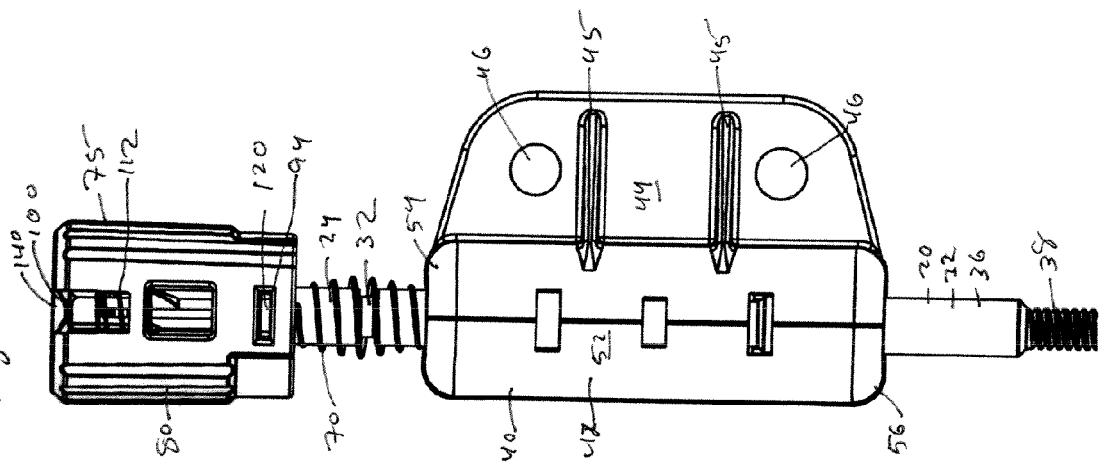

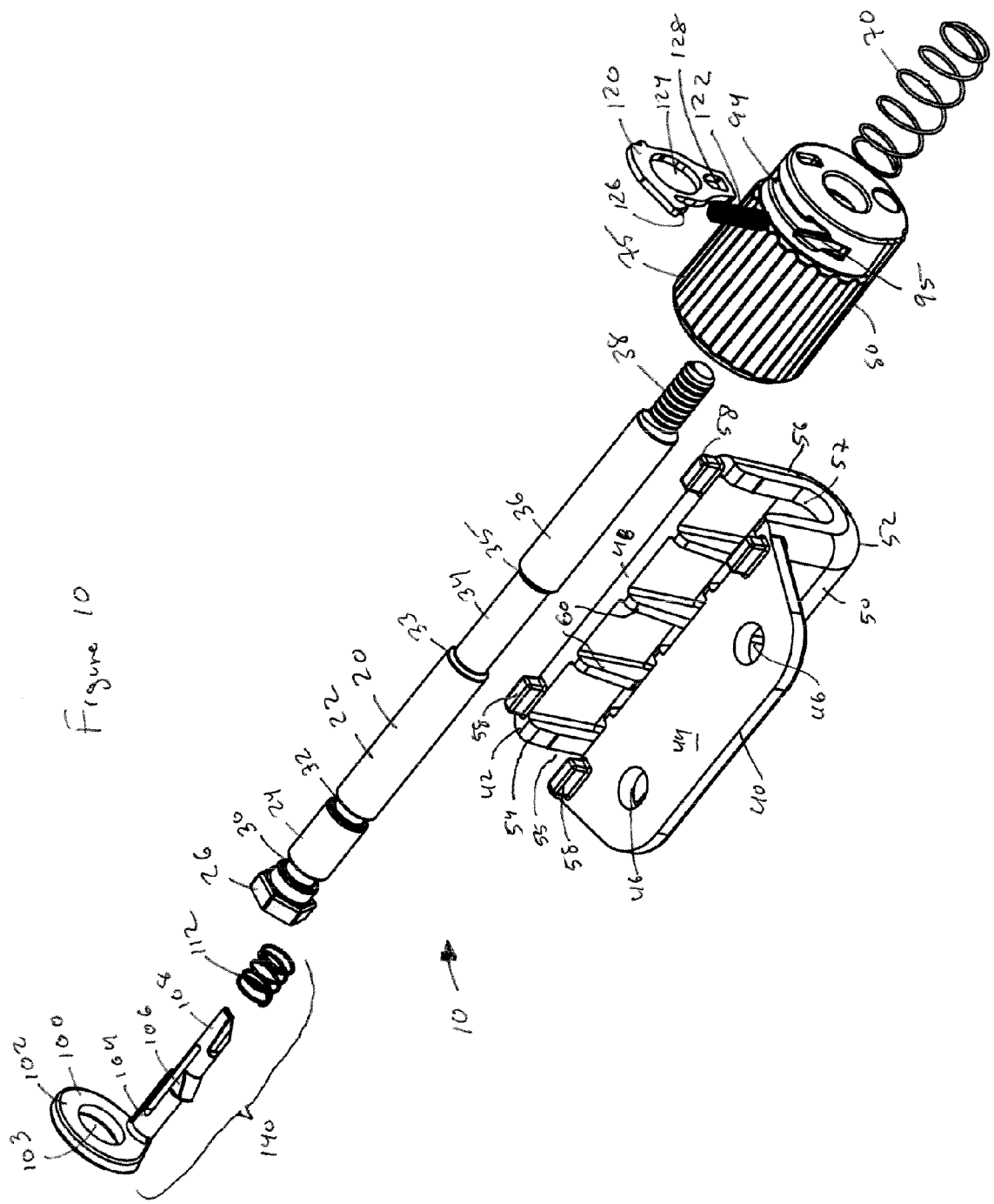

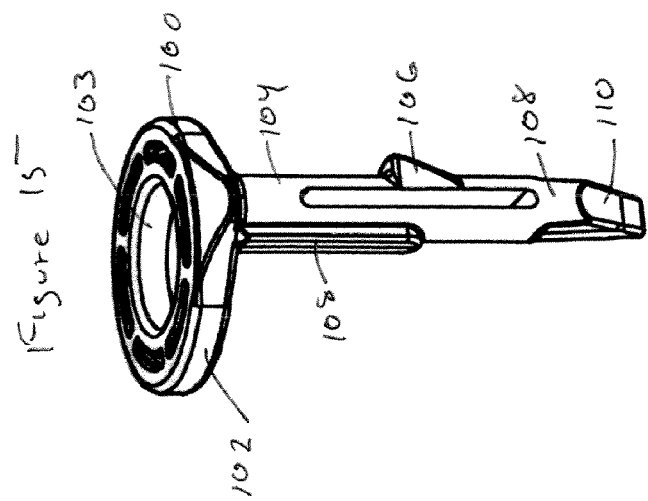
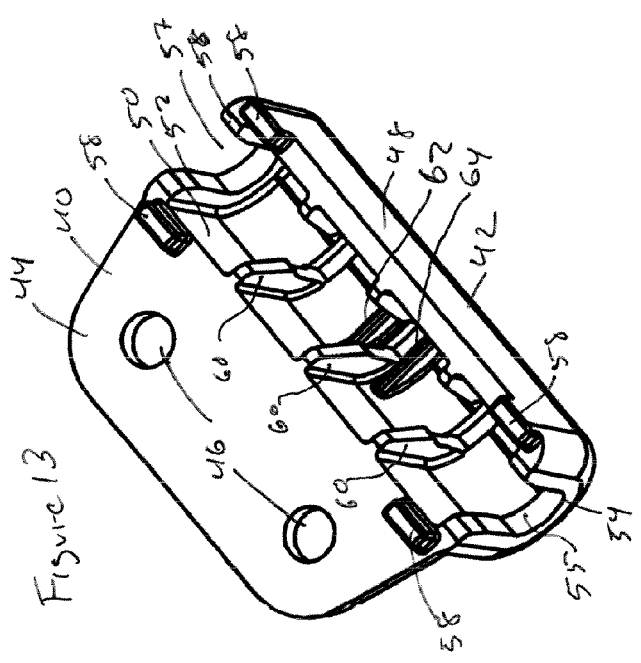

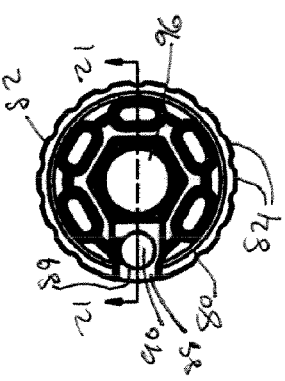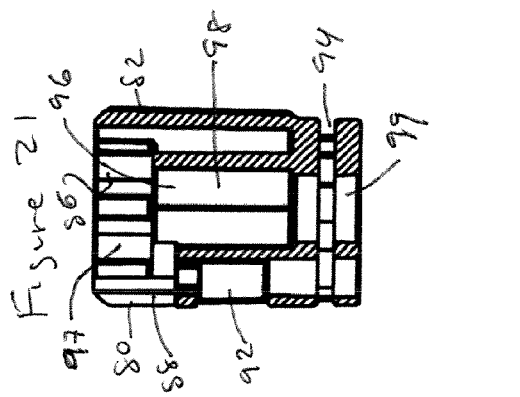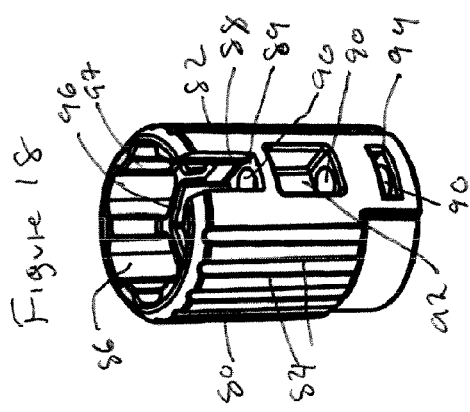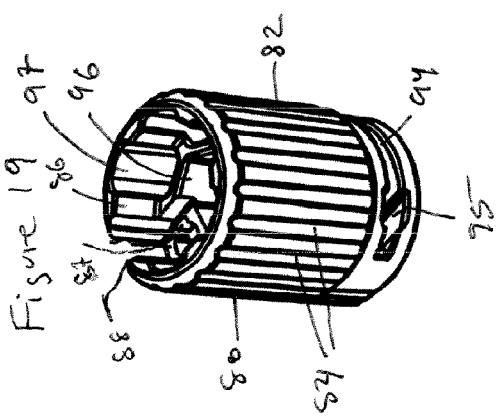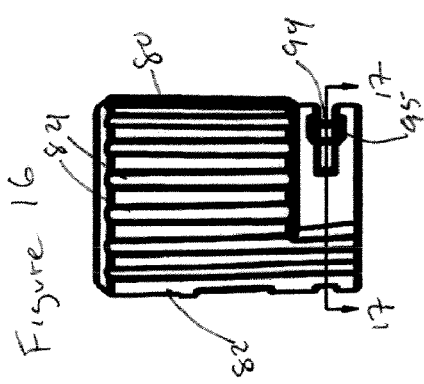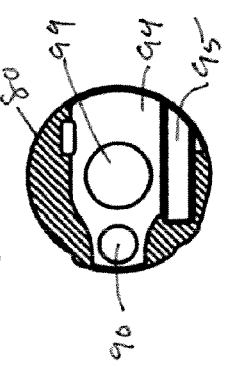

CAPTIVE SCREW WITH DEPLOYABLE KNOB

BACKGROUND OF THE INVENTION

1. Field of the Invention

The present invention relates generally to fasteners for electronic equipment.

2. Brief Description of the Prior Art

Captive screws are fasteners that include a screw portion which is "captivated" or held by a ferrule or like structure that in turn can be attached to a first panel. The screw portion is captivated so that it can be moved with respect to the first panel and the screw's threads can engage a corresponding aperture in a second panel, so that the first and second panels can be secured together. However, when the panels are unscrewed and disengaged, the screw is retained in the first panel. Captive screws are useful in applications where it is important to avoid dropping or losing screws during assembly or repair, such as for electronic devices, where a lost screw can cause catastrophic electrical shorts damaging equipment.

There is a need for an improved captive screw for use in securely attaching removable electronic assemblies, such as PCI card riser cages, to electronic chassis such as rack-mountable computer chassis.

SUMMARY OF THE INVENTION

The present invention provides an improved captive screw for use in electronic assemblies, and in particular for use in releasably securing assemblies such as PCI board riser cages to computer chassis, such server chassis. The captive screw of the present invention is of the type that includes a screw having a shaft with a first end and a threaded end for engaging a first panel. The shaft also has at least two, spaced grooves formed in the shaft. The captive screw further includes a cover captivating the screw and for attaching the captive screw to a second panel.

The captive screw also includes a knob assembly for rotating the screw. The knob assembly is rotationally fixed to the shaft and movable along the shaft. The knob assembly is positioned proximate the first end of the shaft. However, the knob assembly is movable along the shaft of the screw between a first position and a second position. The knob assembly includes a deployable knob and a lock wafer movable in the knob between a locked position and an unlocked position for engaging either one of the grooves formed in the shaft in the locked position. The knob assembly is movable along the shaft when the lock wafer is in the unlocked position, and the screw and knob assembly are fixed to rotate as a unit. The knob assembly further includes an actuator movable for moving the lock wafer between the locked position and the unlocked position. The actuator includes a release button that has a head and that is movable between a locked position and an unlocked position and a spring for biasing the release button in the locked position.

The knob of the present invention has a core cavity with an upper section and a lower section, with the lower section being adapted for receiving the screw. In addition, the upper section has a cross-sectional area that is substantially coextensive with the cross-sectional area of the knob, and the upper section of the core cavity is adapted for receiving the head of the release button. Further, the head of the release button is substantially coextensive with the cross-sectional area of the upper section of the core cavity and the head of the release button is centered in the upper core cavity.

Preferably, the screw has a head adapted to receive a driver, and the head of the release button has an aperture formed therein to provide operation of the screw head with the driver. Further, it is preferred that head of the release button be generally circular. Further, it is preferred that the knob assembly also includes a spring for biasing the lock wafer in the locked position. Preferably, the actuator is movable in a first direction, the lock wafer be moveable in a second direction, with the first direction being perpendicular to the second direction. Preferably, the actuator includes a release button having a camming surface for moving the lock wafer.

The present invention also provides an electronic device such as a server computer including a chassis and at least one removable assembly including electronic components, with the at least one assembly and/or chassis including a captive screw according to the present invention.

BRIEF DESCRIPTION OF THE DRAWINGS

FIG. 1 is a front elevational view of a captive screw according to the present invention shown mounted on a wall of a PCI circuit riser board cage, the captive screw being shown in a first position with the screw in a lowered, engaged position, the knob assembly in a lowered position, and the release button in a raised, locked position, the captive screw securing the PCI circuit riser board cage to a computer server chassis.

FIG. 2 is a sectional elevational view of the captive screw of FIG. 1 taken along the line 2—2 of FIG. 1.

FIG. 3 is an isometric view of the captive screw of FIG. 1, the PCI circuit board cage and chassis being omitted for clarity.

FIG. 4 is an isometric view of the captive screw of FIG. 1 shown in a second position with the screw in a lowered, engaged position, the knob assembly in an elevated position, and the release button in a lowered, unlocked position.

FIG. 5 is an isometric view of the captive screw of FIG. 1 shown in a third position with the screw in a lowered, engaged position, the knob assembly in an elevated position, and the release button in a lowered, unlocked position.

FIG. 6 is an isometric view of the captive screw of FIG. 1 shown in a fourth position, with the screw in a lowered, engaged position, the knob assembly in an elevated position, and the release button in a raised, locked position.

FIG. 7 is rear elevational view of the captive screw of FIG. 1 shown in the position of FIG. 5.

FIG. 8 is side elevational view of the captive screw of FIG. 1 shown in the position of FIG. 5 as seen from the left.

FIG. 9 is a front elevational view of the captive screw of FIG. 1 shown in the position of FIG. 5.

FIG. 10 is an exploded isometric view of the captive screw of FIG. 1.

FIG. 11 is a top plan view of the captive screw of FIG. 1.

FIG. 12 is a bottom plan view of the captive screw of FIG. 1.

FIG. 13 is an isometric view of the assembly cover of the captive screw of FIG. 1, as seen from the rear.

FIG. 14 is an isometric view of the lock wafer of the captive screw of FIG. 1.

FIG. 15 is an isometric view of the release button of the captive screw of FIG. 1.

FIG. 16 is a side elevational view of the knob of the captive screw of FIG. 1.

FIG. 17 is a horizontal sectional view of the knob of FIG. 16 taken along the lines 17—17.

FIG. 18 is an isometric view of the knob of FIG. 16 as seen from the left front.

FIG. 19 is an isometric view of the knob of FIG. 16 as seen from the right rear.

FIG. 20 is a top plan view of the knob of FIG. 16.

FIG. 21 is a horizontal sectional elevational view of the knob of FIG. 16 taken along the line 21—21.

DETAILED DESCRIPTION

The present invention provides a captive screw for electronic assemblies. The captive screw of the present invention is especially useful for releasably securing electronic assemblies such as PCI card riser cages to a computer server chassis or motherboard.

Referring now to the drawings in detail, wherein like reference numerals indicate like elements throughout the several views, there is shown in FIG. 1 a front elevational view of a captive screw 10 according to the present invention. The captive screw 10 includes a screw 20, an assembly cover 40, and a knob assembly 75, and is shown mounted on a vertical wall 152 of a PCI board riser cage or first structure 150 by a pair of mounting bolts 162. The captive screw 10 is shown in FIG. 1 as securing the PCI card riser cage 150 to a computer server chassis or second structure. FIG. 2 depicts a vertical elevational sectional view of the captive screw 10 of FIG. 1 taken along the lines 2—2.

FIGS. 3–6 show the captive screw 10 of FIG. 1 without the PCI board riser cage 150 in a series of positions as explained below. FIG. 10 is an exploded isometric view of the captive screw of FIG. 1.

The screw 20 includes a generally cylindrical shaft 22 (best seen in the isometric view of FIG. 10) with a hexagonal head 26 at the upper end of the screw 20 and a threaded section 38 at the lower end of the screw 20. As best seen in the top plan view of FIG. 11, the head 26 of the screw 20 includes a driver recess 28 adapted to receive a driver for tightening or loosening the screw 20. While a Torx®-type driver recess is illustrated, other types of driver recesses, such as slotted, Phillips, hexagonal, and the like, and combinations thereof (e.g. slot-Torx), can also be used. As can be seen in the sectional view of FIG. 2 and the exploded isometric view of FIG. 10, a generally cylindrical upper section 24 extends coaxially downward from the head 26 to a generally cylindrical throat or middle section 34 having a diameter reduced from that of the upper section 24, a first or upper shoulder 33 being thus formed therebetween by virtue of the difference in diameter. A generally cylindrical lower section 36 extends coaxially from the middle section 34 and terminates in the coaxial threaded section 38 at the lower end of the screw 20. The lower section 36 has a diameter that is the same as the upper section 24, and the diameter of the lower section 36 is greater than the diameter of the middle section 34. A lower shoulder 35 is formed between the middle section 34 and the lower section 36 by virtue of the difference in diameter therebetween. There is a pair of spaced, circumferential grooves 30, 32 formed in the upper section 24 of the shaft 22. The first or upper groove 30 is formed proximate the head 26, and the second or lower groove 32 is formed at a specific distance from the first groove 30. The second groove 32 is chamfered on the upper side thereof (that is, the side closest to the first groove 30) for a purpose described below. As described in detail below, the grooves 30, 32 served to fix the location of the knob assembly 75 on the shaft 22 of the screw 20 when the knob assembly 75 is locked to the shaft 22 of the screw 20.

As best seen in the isometric bottom view of the FIG. 13, the assembly cover 40 includes a generally half-cylindrical body 42 from which extends a generally rectangular flange 44 having a pair of spaced apertures 46 for receiving mounting bolts 162 (FIG. 1). The cover 40 also includes a pair of generally triangular stiffening elements 45 (FIG. 1) that extend between the body 42 and the flange 44 to provide rigidity and strength to the cover 40. As shown in FIG. 13, the body 42 of the cover 40 includes a generally rectangular first side wall 48 and a parallel generally rectangular second side wall 50. The first side wall 48 and the second side wall 50 are connected by a generally semi-cylindrical top wall 52 extending from the upper portions thereof. The body 42 of the cover 40 also includes a first or upper end wall 54 and a second or lower end wall 56. The first and second end wall 54, 56 each include a respective generally "U"-shaped aperture 55, 57. A plurality of tabs 58 extend from the lower portions of the first side wall 48 and the second side wall 50. As can be seen in FIG. 1, the tabs 58 are received by corresponding respective slots or apertures 153 formed in a wall 152 of the PCI board riser cage 150 to position the captive screw 10 on the wall 152 when the captive screw 10 is mounted on the cage 150.

As can be seen in FIGS. 2, 7 and 10, the body 42 of the cover 40 also includes a plurality of generally "U"-shaped snap-in retaining ribs 60 formed on the inside of the body 42. The ribs 60 are sized and shaped to rotatably receive the upper and lower sections 24, 36 of the shaft 22 of the screw 20.

The cover 40 is preferably formed from a thermoplastic material by a molding technique, such that the body 42 is sufficiently deformable to permit the screw 20 to be "snapped" into the retaining ribs 60 by applying moderate force to momentarily deform the lower portions of the ribs 60, which are otherwise spaced apart, at their point of closest approach, by a distance less than the diameter of the upper and lower sections 24, 36 of the shaft 22 (best seen in FIG. 13). The upper portions of the retaining ribs 60 are shaped and spaced to permit the shaft 22 to rotate and to move longitudinally within the cover 40.

As can be seen in the rear elevational view of FIG. 7, and the vertical sectional view of FIG. 2, the cover 40 also includes a first or upper stop rib 62 and a second or lower stop rib 64 formed on the inside of the body 42. The stop ribs 62, 64 are sized and positioned to contact respective shoulders 33, 35 formed on the shaft 22 of the screw 20 formed between the reduced diameter middle section 34 and the upper section 24 and lower section 36 respectively, thus limiting the longitudinal travel of the screw 20 within the cover 40 as described in detail below. The cover 40 is bilaterally symmetric, so that the captive screw 10 can be assembled and installed with the flange 44 extending either to the left or the right.

As can be seen in FIG. 1, the knob assembly 75 includes a knob 80 to be grasped by an operator to actuate the captive screw 10. The knob 80, best seen in FIGS. 16–21, is preferably formed by molding a suitable thermoplastic material, and includes a plurality of knurls 84 formed on its exterior surface 82 to assist the operator in grasping the knob 80.

The knob 80 includes a central core cavity 96 (FIGS. 18–21). As best seen in the vertical cross-sectional view of FIG. 21, the core cavity 96 is divided into an upper section or upper core cavity 97, a middle section or middle core cavity 98, and a lower section or lower core cavity 99. The upper core cavity 97 has a generally circular cross-section, and generally cylindrical shape, as best seen in the isometric views of FIGS. 18 and 19, and the top plan view of FIG. 20. As best seen in the vertical cross-sectional view of FIG. 21, the upper core cavity 97 extends about one-quarter the height of the knob 80. The middle core cavity 98 has a generally hexagonal cross-section, best seen in the top plan view of FIG. 20, and extends about one-half the height of the knob 80, as best seen in vertical sectional view of FIG. 21. The lower core cavity 99 has a generally circular cross-section, best seen in the horizontal sectional view of FIG. 17 and the top plan view of FIG. 20, and extends about one-quarter the height of the knob 80, best seen in the vertical sectional view of FIG. 21.

The middle core cavity 98 of the knob 80 preferably is shaped and sized to receive the head 26 of the screw 20 such that the knob assembly 75 and the screw 20 are fixed to rotate together, while the lower core cavity 99 is preferably sized and shaped to receive the shaft 22 of the screw 20. Thus, in the illustrated embodiment, the cross-section of the middle core cavity 98 has a generally hexagonal shape that is slightly larger than the hexagonal head 26 of the screw 20, and the knob assembly 75 must necessarily rotate with the screw 20. Thus, when an operator rotates the knob assembly 75, the screw 20 also rotates. However, while the knob assembly 75 and the screw 20 are fixed with respect to rotation, the knob assembly 75 can move longitudinally along the axis of the screw 20. In the illustrated embodiment, the generally hexagonal middle core cavity 98 extends for about one-half the length of the knob 80. However, proximate the bottom of the knob 80, the core cavity 96 assumes a generally circular shape, forming the lower core cavity 99, with a diameter slightly greater than the exterior diameter of the upper section 24 of the shaft 22 of the screw 20, to limit the travel of the knob assembly 75 with respect to the screw 20, and to prevent the head 26 from passing through the bottom of the knob 80.

As can be seen, for example, in FIGS. 1 and 2, the knob assembly 75 also includes a lock wafer 120 for locking the longitudinal position of the knob assembly 75 with respect to the screw 20. As best seen in FIGS. 16–19 and 21, the knob 80 includes a generally rectangular lock wafer cavity 94 formed proximate the bottom end of the knob 80 and extending through the knob 80 for receiving a generally planar lock wafer 120 which can be formed by stamping from suitable metal sheet stock.

As best seen in the isometric view of FIG. 14, the lock wafer 120 includes a large generally circular central aperture 124 for receiving the shaft 22 of the screw 20 when the captive screw 10 is assembled. The lock wafer cavity 94 is sized and shaped to permit the lock wafer 120 to move perpendicularly to the axis of the shaft 22 of the screw 20 (best seen in the horizontal cross sectional view of the knob 80, FIG. 17).

When the knob assembly 75 and the shaft 22 are aligned so that the lock wafer cavity 94 is aligned with either the first groove 30 or the second groove 32 formed on the shaft 22, the lock wafer 120 can be moved perpendicularly to the axis of the shaft 22 between a first position in which the shaft 22 passes freely through the central aperture 124 in the lock wafer 120 to a second position in which the edge of lock wafer 120 surrounding the central aperture 124 in the lock wafer 120 engages either the first groove 30 or the second groove 32 (as shown in the sectional elevational view of FIG. 2) of the shaft 22, thus preventing the knob assembly 75 from being moved longitudinally along the shaft 22 of the screw 20.

The knob 80 also includes a blind lock wafer spring cavity 95 (FIGS. 10, 16, 17, and 19) for receiving a lock wafer return spring 122 (FIG. 10). One end of the lock wafer return spring 122 is received on a respective tab 126 formed on the lock wafer 120 (FIG. 14) so that when the captive screw 10 is assembled, the lock wafer 120 is biased against the shaft 22, such that when the knob assembly 75 is moved longitudinally on the shaft 22 and either the first groove 30 or the second groove 32 on the shaft 22 is encountered, the interior edge of the lock wafer 120 is forced into the groove by the lock wafer return spring 122, and the knob assembly 75 is thus locked at that position on the shaft 22 by the engagement of the lock wafer 120 with the shaft 22 of the screw 20.

An operator can disengage the lock wafer 120 from the shaft 22 by operating a clutch or actuator 140 including a release button 100 and a release button return spring 112.

As best seen in FIGS. 1, 18, and 19, the knob 80 includes generally rectangular release button cutout 88 formed proximate the top of the knob 80 and extending through from the exterior surface 82 of the knob 80 to the interior surface 86 of the knob 80, and about one-third the longitudinal dimension of the knob 80 (best seen in FIGS. 1 and 18) and bounded at the bottom by a generally rectangular bottom wall 89 (FIG. 18). Centered in the bottom wall 89 of the release button cutout 88 is a generally cylindrical release button shaft aperture 90 that extends through to the bottom of the knob 80 parallel to the central core cavity 96 for a purpose to be described. The release button shaft aperture 90 intersects and is centered upon the lock wafer cavity 94. Another generally rectangular cavity, the lock button tab cutout 92 (FIG. 1), extending from the exterior surface 82 to the interior surface 86 of the knob 80, is positioned between the release button cutout 88 and the lock wafer cavity 94.

The release button 100, best seen in the isometric view of FIG. 15, includes a generally cylindrical release button head 102. The generally cylindrical release button head 102 advantageously provides an operator with a larger contact surface for actuating the knob assembly 75, and is believed to tend to reduce the likelihood of accidental actuation of the captive screw 10.

The upper section 97 of the central core cavity 96 (FIG. 18) is adapted to receive the generally cylindrical head 102 of the release button 100 (FIG. 15). As best seen in FIGS. 18–21, the upper section 97 has a cross-sectional area that is substantially coextensive with that of the cross-sectional area of the knob 80, that is, the internal diameter of the knob 80 is only slightly smaller than the exterior diameter of the knob 80, so that the upper section 97 of the core cavity 96 has a large cross-sectional area relative to the knob 80. Similarly, as best seen in FIGS. 2–6, the cross-sectional area of the head 102 of the release button 100 is substantially coextensive with the cross-sectional area of the upper section 97 of the core cavity 96; that is, the exterior diameter of the head 102 of the release button 100 is only slightly smaller than the interior diameter of the upper section 97 of the core cavity 96. Further, the head 102 of the release button 100 is centered in the upper section 97 of the core cavity 96 (FIG. 11). The thickness of the head 102 of the release button 100 is about one-quarter the height of the upper section 97 of the core cavity 96 (FIG. 2). The head 102 of the release button 100 is provided with an aperture 103 formed therein to provide access to the driver recess 28 formed in the head 26 of the screw 20, best seen in FIGS. 11 and 15.

As shown in the isometric view of FIG. 15, extending downwardly at one side of the release button head 102 a generally cylindrical shaft 104 is provided. When installed in the knob 80 (FIGS. 1, 2), the release button shaft 104 is received by the release button shaft aperture 90, such that the release button head 102 can travel within the release button cutout 88.

A release button return spring 112 (best seen in FIGS. 1, 2 and 10) is positioned on the release button shaft 104 between the release button head 102 and the lower wall 89 of the release button cutout 88. The release button return spring 112 biases the release button 100 upward.

Proximate the middle of the release button 100 and extending from one side of the release button shaft 104 is a release button retention tab 106. As best seen in the isometric view of FIG. 15 the release button shaft 104 is split longitudinally proximate the center thereof to permit the shaft 104 to be compressed longitudinally during installation of the release button 100 in the knob 80. The release button retention tab 106 has an upwardly angled outer surface. In order to limit rotation of the release button 100 about the release button shaft 104, a small shoulder 108 is provided the side of the release button shaft 104 opposite the release button retention tab 106, the shoulder 108 extending within a small notch 87 formed on one side of the release button shaft aperture 90. The notch 87 formed in the release button shaft aperture 90 can be seen in FIG. 19.

The release button 100 is installed by positioning the release button shaft 104 in the release button shaft aperture 90 and pressing down. When the tab 106 encounters the lower wall 89 of the release button cutout 88, a camming action between the outer edge of the tab 106 and the interior wall of the release button aperture 90 compresses the split shaft 104 so that the portion of the shaft 104 carrying the tab 106 can pass in the aperture 90 between the upper wall 89 and the retention tab cutout 92. Once in the cutout 92, the split shaft 104 springs back, and the upper end of the retention tab 106 prevents the shaft from passing upward through the aperture 90, thus retaining the release button 100 in the knob 80. The release button 100 can move longitudinally within the knob 80. However, the downward longitudinal movement of the release button 100 is limited by contact of the release button head 102 with the lower wall 89 of the release button cutout 88, and the upward longitudinal movement of the release button 100 is limited by the contact of the upper end of the tab 106 with the upper side of the retention tab cutout 92.

The bottom end 108 of the release button 100 is angled to provide a camming surface 110 for contacting the lock wafer 120 (FIGS. 10 and 15). As best seen in FIG. 14, the lock wafer 120 has a second aperture 128 formed proximate one end, to receive the bottom end 108 of the release button 100 when the lock wafer 120 is positioned in the lock wafer cavity 94. A generally flat camming surface 130 is formed at the outward end of the second aperture 128 for contacting the camming surface 110 of the release button 100.

To release the knob assembly 75 from a locked position on the shaft 22 of the screw 20 an operator simply depresses the head 102 of the release button 100 against the bias of the release button return spring 112 positioned on the release button shaft 104 between the button head 102 and the lower wall 89 of the release button cutout 86. At the bottom 108 of the release button 100 the downward movement of the angled camming surface 110 forces the lock wafer 120 to move transversely against the bias of the lock wafer return spring 122 to disengage the lock wafer 120 from either one of the grooves 30, 32 in the shaft 22. The operator can then easily displace the knob assembly 75 axially along the shaft 22 of the screw 20.

As shown in FIGS. 1, 2 and 5–9, the captive screw 10 also includes a spring 70 positioned on the shaft 22 of the screw 20 between the upper end wall 54 of the cover 40 and the knob assembly 75 for biasing the knob assembly 75 and the cover 40 apart.

Assembly of the captive screw 10 of the present invention is simple (FIG. 10). The lock wafer return screw 122 is placed in the lock wafer spring cavity 95 in the knob 80, and the lock wafer 120 is then inserted in the lock wafer cavity 94. The release button return spring 112 is placed over the release button shaft 104, and the release button shaft 104 is then inserted in the release button shaft aperture 90. The head 102 is rotated to align the head 102 with the release button cutout 86, and the release button 100 is then pressed down, with the lock waver 120 being aligned so that the release button shaft 104 passes through the release button aperture 128 formed in the lock wafer 120, until the retention tab 106 passes into the release button retention tab cutout 92 to lock the release button 100 in the knob 80.

The screw 20 can then be inserted into the top of the core cavity 96 of the knob 80, the shaft spring can be placed over the shaft 22, and the assembly cover 40 can be snapped onto the shaft 22, completing the assembly of the captive screw 10.

The operation of the captive screw 10 of the present invention can be understood with reference to FIGS. 1–6.

In FIGS. 1–3, the captive screw 10 is shown in a first position with the screw 20 in a lowered position, with the threaded section 38 of the screw 20 engaging a corresponding threaded aperture in a computer chassis 160 (FIGS. 1, 2). The captive screw 10 is shown mounted on a wall 152 of a PCI card riser cage 152. The knob assembly 75 is in a lowered position, with the top of the knob 80 being flush with the cage top 158. The knob assembly 75 is locked on the second or lower groove 32 formed on the shaft 22 by the lock wafer 120.

To remove the card cage 150 from the chassis 160, an operator simply pulls the knob assembly 75 upward and the lock wafer 120 releases from the second groove 32 because the upper side of the second groove 32 is chamfered as noted above. If desired, the chamfer can be omitted so that the release button 100 must be pressed down to release the grip of the lock wafer 120 on the second or lower groove 32 in the shaft 20 (FIG. 4), and the force of the shaft spring 70 raises the knob assembly 75 upward until the lock wafer 75 engages the first or upper groove 30 formed in the shaft 22, as shown in FIG. 6. At this point, the knob assembly 75 is elevated above the top cover 158 of the cage 150, and can easily be grasped, and rotated to disengage the threaded section 38 of the shaft 22 of the screw 20 from the chassis 160. If needed, a driver (not shown) can be inserted in driver recess 28 formed in the head 26 of the screw so more torque can be applied to dislodge the screw 20. When the threaded section 38 turns out of contact with the chassis 160, the spring 70 forces the screw clear of the chassis 160 so that the cage 150 can be easily removed. The process is repeated for each captive screw 10 installed on the card cage 150. To install the card cage 150 on the chassis 160, sequence of step is reversed. The captive screw 10 is aligned with a corresponding respective aperture formed in the chassis 160, and the knob assembly 75 is rotated to seat the threaded section 38 of the shaft 22 of the screw 20 in the respective aperture. Next, the operator presses the release button 100 (FIG. 5) and pushes the knob assembly 75 down the shaft 22 to the second or lower groove 32.

Various other modifications can be made in the details of the various embodiments of the apparatus of the present invention, all within the scope and spirit of the invention and defined by the appended claims.

What is claimed is:

1. A captive screw with a deployable knob for electronic assemblies, the captive screw comprising:
   (a) a screw having a shaft with first end, and a threaded end for engaging a first panel, and at least two, spaced, grooves formed in the shaft;
   (b) a cover captivating the screw and for attaching the captive screw to a second panel;
   (c) a knob assembly rotationally fixed to the shaft and movable along the shaft, the knob assembly being positioned proximate the first end of the shaft;
   the knob assembly being movable between a first position and a second position and including:
      (1) a knob having a core cavity; and
      (2) a lock wafer movable in the knob between a locked position and an unlocked position for engaging either one of the grooves formed in the shaft in the locked position, the knob assembly being movable along the shaft when the lock wafer is in the unlocked position, the screw and knob assembly being fixed to rotate as a unit; and
      (3) a clutch for moving the lock wafer between the locked position and the unlocked position, the clutch including:
         (A) a release button having a head and being movable between a locked position and an unlocked position; and
         (B) a spring for biasing the release button in the locked position;
   the knob having the core cavity with an upper section and a lower section, the lower section being adapted for receiving the screw, the upper section having a cross-sectional area substantially coextensive with the cross-sectional area of the knob, the upper section of the core cavity being adapted for receiving the head of the release button, the head of the release button being substantially coextensive with the cross-sectional area of the upper section of the core cavity and centered in the upper core cavity.

2. A captive screw according to claim 1, wherein the release button head provides an operator with a large contact surface for actuating the knob assembly, thus reducing the likelihood of accidental actuation of the captive screw.

3. A captive screw according to claim 1 wherein the screw has a head adapted to receive a driver, the head of the release button having an aperture formed therein to provide operation of the screw head with a driver.

4. A captive screw according to claim 1 wherein the head of the release button is generally circular.

5. A captive screw according to claim 1, the knob assembly further including a spring for biasing the lock wafer in the locked position.

6. A captive screw according to claim 1, the release button being movable in a first direction, the lock wafer being moveable in a second direction, the first direction being perpendicular to the second direction.

7. A captive screw according to claim 1, the release button having a camming surface for moving the lock wafer.

8. An electronic device including a chassis and at least one removable assembly including electronic components, the at least one assembly including a captive screw with a deployable knob, the captive screw comprising:
   (a) a screw having a shaft with a threaded end for engaging a first panel and at least two, spaced, grooves formed in the shaft;
   (b) a cover captivating the screw and for attaching the captive screw to a second panel;
   (c) a knob assembly rotationally fixed to the shaft and movable along the shaft, the knob assembly being positioned proximate the first end of the shaft;
   the knob assembly being movable between a first position and a second position and including:
      (1) a knob having a core cavity; and
      (2) a lock wafer movable in the knob between a locked position and an unlocked position for engaging either one of the grooves formed in the shaft in the locked position, the knob assembly being movable along the shaft when the lock wafer is in the unlocked position, the screw and knob assembly being fixed to rotate as a unit; and
      (3) a clutch for moving the lock wafer between the locked position and the unlocked position, the clutch including:
         (A) a release button having a head and being movable between a locked position and an unlocked position; and
         (B) a spring for biasing the release button in the locked position;
   the knob having the core cavity with an upper section and a lower section, the lower section being adapted for receiving the screw, the upper section having a cross-sectional area substantially coextensive with the cross-sectional area of the knob, the upper section of the core cavity being adapted for receiving the head of the release button, the head of the release button being substantially coextensive with the cross-sectional area of the upper section of the core cavity and centered in the upper core cavity.

9. An electronic device according to claim 8, wherein the release button head provides an operator with a large contact surface for actuating the knob assembly, thus reducing the likelihood of accidental actuation of the captive screw.

10. An electronic device according to claim 8 wherein the screw has a head adapted to receive a driver, the head of the release button having an aperture formed therein to provide operation of the screw head with a driver.

11. An electronic device according to claim 8 wherein the head of the release button is generally circular.

12. An electronic device according to claim 8, the knob assembly further including a spring for biasing the lock wafer in the locked position.

13. An electronic device according to claim 8, the release button between movable in a first direction, the lock wafer being moveable in a second direction, the first direction being perpendicular to the second direction.

14. An electronic device according to claim 8, the release button having a camming surface for moving the lock wafer.

* * * * *